United States Patent [19]

Forster

[11] Patent Number: 5,628,579
[45] Date of Patent: May 13, 1997

[54] EXPANSION DOWEL WITH SLEEVE AND EXPANSION MEMBER

[75] Inventor: Hubert Forster, Moorenweis, Germany

[73] Assignee: Hilti Aktiengesellschaft, Furstentum, Liechtenstein

[21] Appl. No.: 580,784

[22] Filed: Dec. 29, 1995

Related U.S. Application Data

[63] Continuation of Ser. No. 199,379, Feb. 18, 1994, abandoned.

[30] Foreign Application Priority Data

Feb. 22, 1993 [DE] Germany .......................... 43 05 381.5

[51] Int. Cl.⁶ ........................................... F16B 13/04
[52] U.S. Cl. .................... 403/297; 403/2; 411/39; 411/40; 411/60
[58] Field of Search ........................ 403/2, 289, 290, 403/292, 294, 297; 405/259.1, 259.4; 411/39, 40, 41, 60

[56] References Cited

U.S. PATENT DOCUMENTS

| 2,402,287 | 6/1946 | Kearns | 411/41 |
|---|---|---|---|
| 3,201,166 | 8/1965 | Boutin | 403/290 X |
| 3,340,762 | 9/1967 | Bennett | 411/41 |
| 3,765,295 | 10/1973 | Ptak | 411/41 |
| 4,085,651 | 4/1978 | Koscik | 411/41 X |
| 4,109,556 | 8/1978 | Vollmer et al. | 411/57 |
| 4,235,151 | 11/1980 | Udert et al. | 411/60 |
| 4,402,637 | 9/1983 | Seghezzi et al. | 411/39 X |
| 4,968,199 | 11/1990 | Haage et al. | 411/39 |

FOREIGN PATENT DOCUMENTS

| 1370201 | 7/1964 | France | 411/41 |
|---|---|---|---|
| 2617212 | 11/1977 | Germany | 403/297 |
| 4022482 | 1/1992 | Germany | 403/297 |
| 994424 | 6/1965 | United Kingdom | 411/41 |
| 1122512 | 8/1968 | United Kingdom | 411/41 |

*Primary Examiner*—Blair Johnson
*Assistant Examiner*—Andrea Chop
*Attorney, Agent, or Firm*—Anderson Kill & Olick P.C.

[57] ABSTRACT

The expansion dowel includes an expansion sleeve (1) and an expanding member (5). The expansion sleeve 1 is provided with a bore (2) tapering in the setting direction as well as with open ended longitudinal slots (3). The expanding member (5) has a blind bore (6) open towards the setting side and has a lug (7) projecting from same at its opposite end, wherein the cross-sections of lug (7) and blind bore (6) are matched in such a way to one another, that a rated break point or failure point is formed. The force dependent response of this rated break point leads to a force dependent expansion while maintaining the driving or advance travel (X).

5 Claims, 1 Drawing Sheet

५,६२८,५७९

EXPANSION DOWEL WITH SLEEVE AND EXPANSION MEMBER

This is a continuation application of Ser. No. 08/199,379, filed Feb. 18, 1994, now abandoned.

BACKGROUND OF THE INVENTION

The invention is directed to an expansion dowel having an expansion sleeve which comprises longitudinal slots open towards the setting end as well as a bore tapering inwardly towards the setting or leading end, wherein an expanding member is provided tapering inwardly at least partially towards the setting end and is inserted into the bore of the expansion sleeve and the expanding member has a recess open toward the setting end for purposes of partial radial deformation.

Expansion dowels of the above-mentioned type are in extensive use. They are used in rock, concrete, masonry and other receiving materials of a similar type. As a rule the expansion dowels are installed in such a way, that a receiving aperture is fabricated in the receiving material in a first work step and after inserting the expansion dowel into this receiving aperture, the expansion sleeve is expanded by advancing an expanding member in the setting direction. A setting tool in the form of a dome is used for the expansion process, which in connection with an appropriate driving appliance applies blows to the expanding member.

In order to assure the expansion process and also to facilitate the work of the operating personnel, one proceeds in a way that the expanding member is advanced in the setting direction by means of the setting tool, until it has reached a specific depth inside the expansion sleeve. This depth can be determined only by means of the setting tool, so that the setting tools used here can for instance be provided with an appropriate marking, which indicates to the operator, when the expansion process can be discontinued. Instead of such a marking, a stop shoulder, for instance in the form of a collar, is used at the setting tool in a preferred manner as additional help for the operator, so that apart from a pure visual control an additional positive control by travel limitation of the setting tool is established.

The above-mentioned setting method has the disdvantage, that on the one hand the expanding member covers always the same distance and therefore always widens the expansion sleeve in the same way, independently of the external forces acting upon the expansion sleeve counter to the expansion force. Herein the forces acting upon the expansion sleeve are a function of different factors, for instance in particular of the nature of the receiving material and the diameter or the accuracy of the receiving aperture in the receiving material. Thus it can occur that the constant travel with which the expanding member is advanced inside of the expansion sleeve results in inadequate anchoring values in one extreme case and in another extreme case damages the receiving material due to overstressing, so that this case also results in inadequate anchoring values.

In order to eliminate the above-mentioned disadvantages it is proposed in the DE-PS 26 17 191, to provide an expansion dowel with an expanding member comprising radially deformable zones. In this known expansion dowel the expansion member is also advanced inside of the expansion sleeve always covering the same distance, wherein however depending upon the magnitude of the external forces the deformable zones of the expanding member are being deformed to a greater or lesser extent. This eliminates damage to the receiving material caused by overload and also results in lower anchoring values. However in the known expansion dowel the design of the deformable zones provided in the expanding member has a disadvantageous effect. The proposed design in the shape of webs or slots, if need be connected with a recess, does not permit controlling the deformation behavior. Thus none of the proposed expanding members can produce adequate expansion forces because of the loss of stiffness. A considerable reduction of the anchoring values produced in this known expansion dowel is thus the consequence.

SUMMARY OF THE INVENTION

The primary object of the invention is to provide an expanding dowel with an expanding member by means of which sufficiently high anchoring values are achieved in all application cases with the driving travel of the expanding member remaining constant.

This task is solved in the invention in that a recess in the expanding member is configured as a blind bore and the expanding member has an axially protruding or projecting lug at its end face facing away from the setting direction that is, its trailing end, whose axial projection of the cross-section lies within the axial projection of the cross-section of the adjacent region of the blind bore.

An expanding tool acting upon the expansion member is again used for expanding the expansion dowel proposed in the invention by means of driving the expanding member forward in the expansion sleeve. This setting tool can be equipped in a known manner with means, which assure a specific advance travel of the expanding member. Herein the setting tool engages at the rear or trailing shoulder of the expanding member counter to the setting direction, which because of the inventive design of the expanding member is formed by the axially projecting lug. Since this lug, meaning the axial projection of its cross-section, lies within the axial projection of the cross-section of the adjacent region of the blind bore open towards the setting end or is essentially aligned therewith, a rated failure point extending for instance so as to be annularly shaped is formed in the expanding member. This rated failure point responds if the external forces acting upon the expansion sleeve attain a magnitude interfering with the further advance or driving of the expanding member. With this the most the rearward shoulder formed by the lug is displaced relative to the principal portion of the expanding member, so that the setting tool can be driven into the expansion sleeve to its predetermined extent.

The blind bore opened at the setting or leading end leads together with the existence of the nominal failure point to the additional advantage, that the expanding member can deform radially to limited extent depending upon the action of the external force. This radial deformation of the expanding member occurs to such a limited extent, that on the one hand overloads in the receiving material can be prevented to a certain extent, however on the other hand the expanding member is not weakened in a manner which puts the attainment of sufficient anchoring value in question.

There are certain advantages, in particular from the fabrication point of view, if the blind bore and lug are disposed centrally with respect to the expanding member. In addition a uniform radial deformation of the expanding member is achieved by the above central disposition especially of the blind bore.

The blind bore tapers inwardly expediently in setting direction. Thereby a control and limitation of the radial deformability of the expanding member can be achieved in cooperation with the severed lug, by driving the lug into the tapering blind hole bore and thus leading in a certain way to a widening of the expanding member. Since this effect occurs in particular in connection with the response of the rated failure point, meaning in those cases where large external forces act, the thereby achieved stiffening of the expanding member occurs precisely in those cases when large external forces arise. Preferably, the tapering of the blind bore can amount to a cone angle of approximately 5° to 10°. With this, this cone angle corresponds approximately to the magnitude of the cone angle, at which the bore of the expansion sleeve tapers, this means also at an angle of approximately 5° to 10°.

As far as the stiffness of the expanding member is concerned it is advantageous, if the larger diameter of the blind bore corresponds approximately to 0.3 to 0.5 times the largest external diameter of the expanding member.

Since in order to achieve a dependably functioning rated failure point the axial projections of the cross-section of the blind bore and of the cross-section of the lug overlap approximately in an expedient manner, it is desirable, to give the lug a circular cross-section, wherein preferably the external diameter of a lug designed in such a way corresponds to 0.3 to 0.5 times the largest external diameter of the expanding member. The external diameter of the lug corresponds herein essentially to the diameter of the adjacent region of the blind bore, this means with a blind bore tapering opposite to the setting direction or towards the trailing end to the rearmost and largest diameter.

In connection with the dimensioning of the lug as far as the diameter is concerned it is advantageous in view of its stiffness, if its length corresponds approximately to 0.3 to 0.5 times the largest external diameter of the expanding member.

In order to achieve the preferred conditions as far as the dimensioning of the nominal failure point is concerned, the length of the blind bore corresponds expediently to 0.8 to 0.9 times the length of the expanding member without including the lug therein. Thus by the length of the expanding member the length from the leading end face in the setting direction up to the trailing end face opposite the setting direction is meant, without the lug projecting away from this end face. The failure point thus has an axially measured length, which corresponds to 0.2 to 0.1 times the length of the expanding member measured between the above-mentioned end faces.

In the following the invention is described with particularity with the help of drawings reflecting an embodiment example thereof. It is shown on:

DETAILED DESCRIPTION OF THE INVENTION

Figure 1:
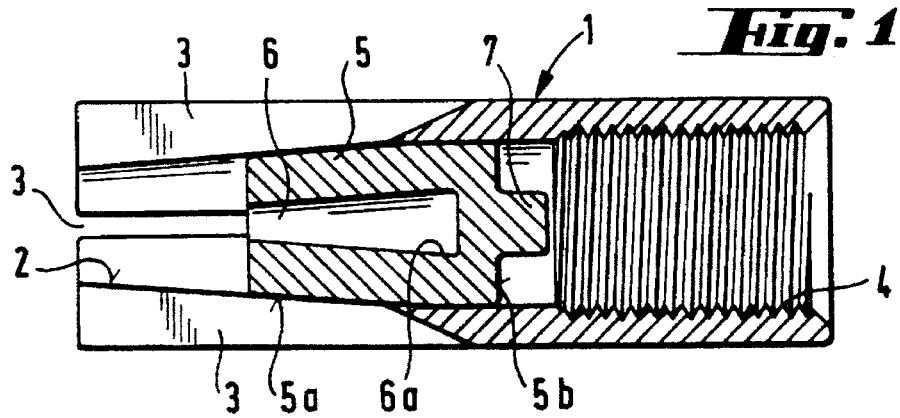
FIG. 1 is an axially extending sectional view of an expansion dowel according to the invention in condition ready to be set.

The expansion dowel shown in FIG. 1 consists of an expansion sleeve 1 comprising a bore 2 tapering towards the setting or leading end that is, the left hand end in the drawings. The expansion sleeve 1 is provided with longitudinal slots 3, also open at the setting end. The expansion sleeve 1 has engagement means adjacent the trailing end facing away from the setting direction, which in this case is for instance configured in the form of an internal thread 4.

An expanding member 5 is supported within the bore 2. This expanding member 5 has an external contour 5a tapering inwardly in the setting direction and is provided with a blind bore 6 open towards the setting direction that is, at the leading end. The blind bore 6 tapers inwardly in the setting direction. The trailing end face 5b of the expanding member 5 facing away from the setting direction carries a lug 7 which protrudes beyond the expanding member 5. As FIG. 1 but also FIGS. 2 and 3 show, the axial projection of the cross-section of the lug 7 in the example chosen corresponds essentially to the axial projection of the cross-section of the adjacent trailing end region 6a of the blind hole bore 6.

Figure 2:
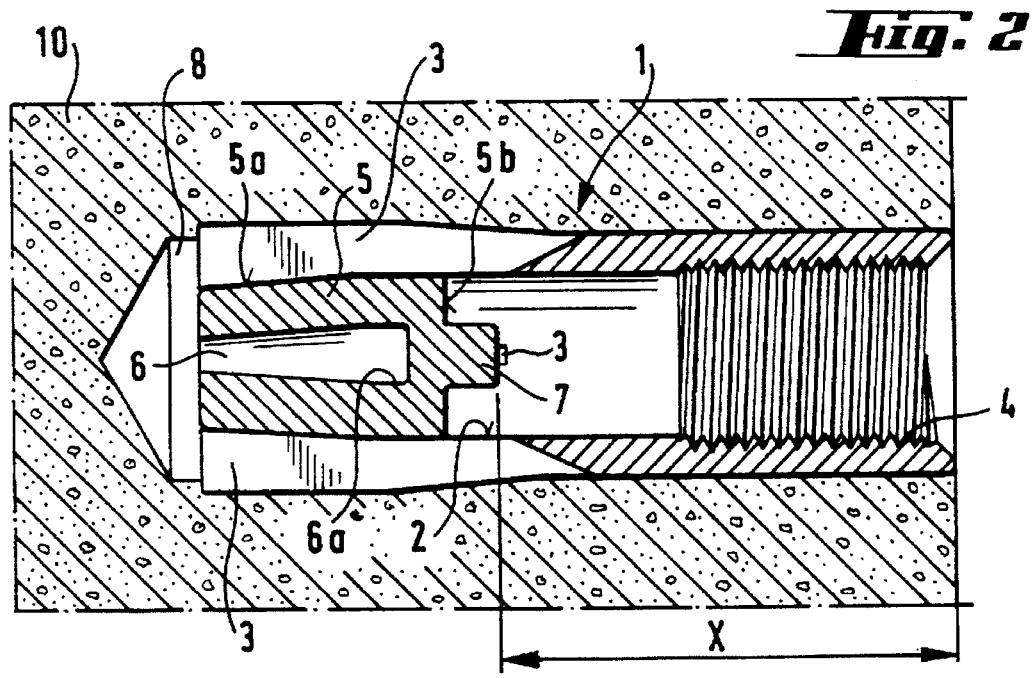
FIG. 2 is an axially extending sectional view of the expansion dowel in FIG. 1 in the installed or set condition in a receiving material without the rated failure point having responded.
Figure 3:
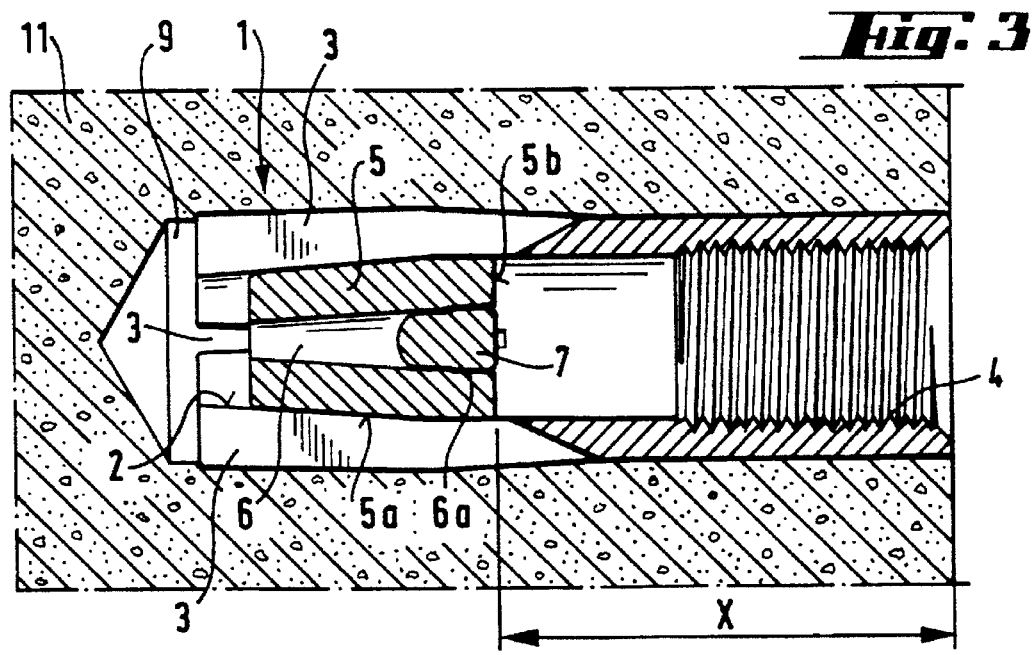
FIG. 3 is an axially extending sectional view of the expansion dowel in FIG. 1 in the set condition with the rated failure point having completely responded.

FIGS. 2 and 3 show the expansion dowel corresponding to FIG. 1, expanded in a receiving bore 8, 9 of a receiving material 10, 11. In both cases the expanding member 5 has been driven towards the leading end by the dimension X inside the bore 2 in the expansion sleeve 1.

In the extreme case of application corresponding to FIG. 2, the action of the external force was not too great, so that the main portion of the expanding member 5 was driven forward through an extended distance without the rated break point provided in the region of the blind bore 6 and the lug 7 having responded. Correspondingly the expansion sleeve 1 has been greatly widened. In this case, where the external force action was not particularly great, we can for instance have dealt with a relatively soft receiving material 10 or with large tolerances of the receiving bore 8.

An opposite extreme application case is shown in FIG. 3, where we are for instance dealing with a hard receiving material 11 or a receiving bore 9 having close tolerances. For this reason large external force actions have occurred here, so that considerable resistance was encountered when driving the main portion of the expanding member 5 forward. This large resistance has led to a response of the rated break point provided in the region of the blind bore 6 and the lug 7, so that relative displacement has occurred between the lug 7 and the main portion of the expanding member 5. This relative displacement has entailed that the main portion of the expanding member 5 has been driven to a lesser extent into the expansion sleeve 1 with the travel remaining the same, so that the widening of said expansion sleeve is less compared to the application case in FIG. 2.

As FIG. 3 additionally clearly shows, the lug 7 has entered into the blind bore 6 and has assisted there in stiffening the expanding member 5 because of the taper of the blind bore 6.

As FIGS. 2 and 3 show, one can work in both extreme cases and naturally also in all cases lying in between with an expansion tool, which provides the uniform travel a dimension X. Thus it is assured with means on the dowel that in all application cases an expansion of the expansion dowel occurs which is optimum to the respective application circumstances and results in high anchoring values after the travel or dimension X has been used up.

I claim:

1. Expansion dowel with an axially extending expansion sleeve (1) having a leading end and trailing end with axially extending slots (3) open at the leading end and a bore (2) extending between the leading and trailing ends and tapering inwardly at least for an axial part thereof to the leading end, an expanding member (5) for expanding said expansion sleeve and having a leading end and a trailing end (5b) and insertable into said bore (2), said expanding member (5) has an exterior surface tapering inwardly at least partially towards the leading end of said expanding member, said expanding member (5) has a recess open at the leading end thereof for purposes of partial radial deformation, wherein the improvement comprises that said expanding member having an initial position before expansion of said sleeve is commenced located within said bore spaced between and from the leading and trailing ends thereof and a final position after expansion of said sleeve spaced towards the leading end from the initial position and spaced by a uniform dimension (X) from the trailing end of said sleeve the recess of said expanding member (5) is an axially extending blind bore (6) having a leading end at the leading end of said expanding member and a trailing end with said trailing end of said blind bore located closely spaced from said trailing end of said expanding member and forming a closed said trailing end of said expanding member, said expanding member (5) has a lug (7) centered on and formed integrally with said closed trailing end (5b) thereof and projecting axially from the trailing end of said expanding member (5), and an axial projection of a transverse cross section of said lug lies within an axial projection of a transverse cross section of a region (6a) of the blind bore (6) adjacent the closed trailing end thereof, and said closed trailing end of said expanding member and said axially projecting lug affording an axially extending rated annular failure point, and said axially projecting lug and said closed trailing end of said expanding member adapted to be driven into said blind bore (6) towards the leading end of said expanding member after breakage of said rated annular failure point following advancement of said expanding member within said bore (2) towards said leading end of said expansion sleeve.

2. Expansion dowel, as set forth in claim 1, wherein said blind bore (6) has a largest diameter corresponding to 0.3 to 0.5 times a largest external diameter of said expanding member (5) adjacent the trailing end thereof.

3. Expansion dowel, as set forth in claim 2, wherein said lug (7) has a circular transverse cross section with an external diameter corresponding to 0.3 to 0.5 times the largest external diameter of the expanding member (5).

4. Expansion dowel, as set forth in claim 3, wherein said lug (7) has an axial length corresponding to 0.3 to 0.5 times the largest external diameter of said expanding member (5).

5. Expansion dowel, as set forth in claim 3, wherein said blind bore (6) has a length corresponding to 0.8 to 0.9 times a length of the expanding member (5) between the leading and trailing ends thereof.

* * * * *